Fig. 6A
Fig. 6B
Fig. 7D
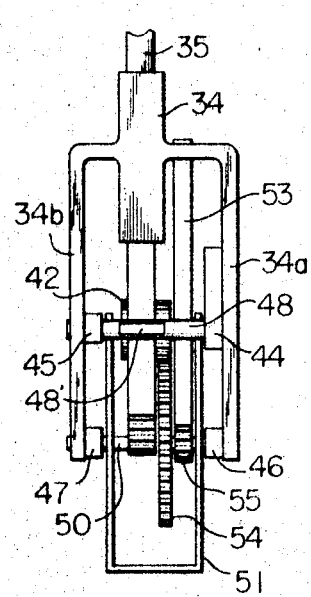
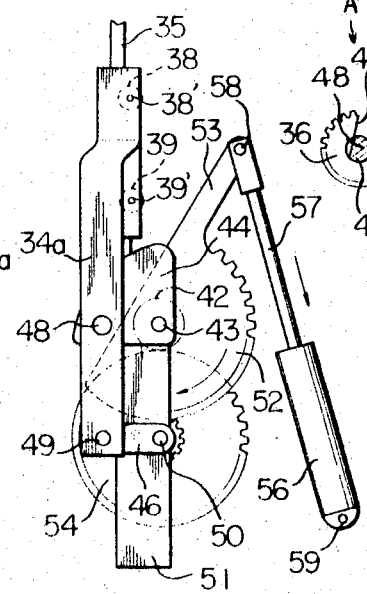
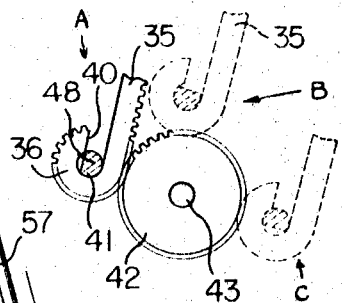
Fig. 7E
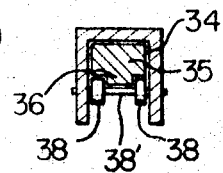
Fig. 7A
Fig. 7C
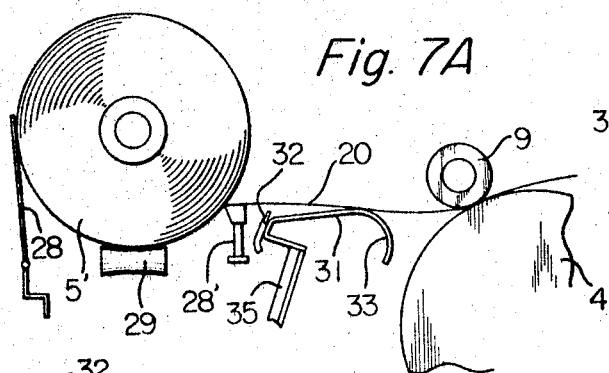
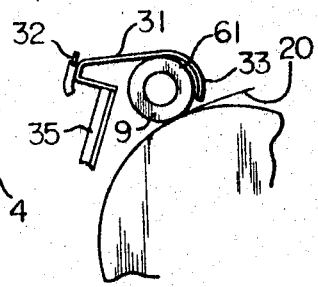
Fig. 7B
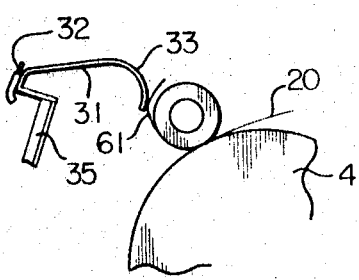

Fig. 8A
Fig. 8B
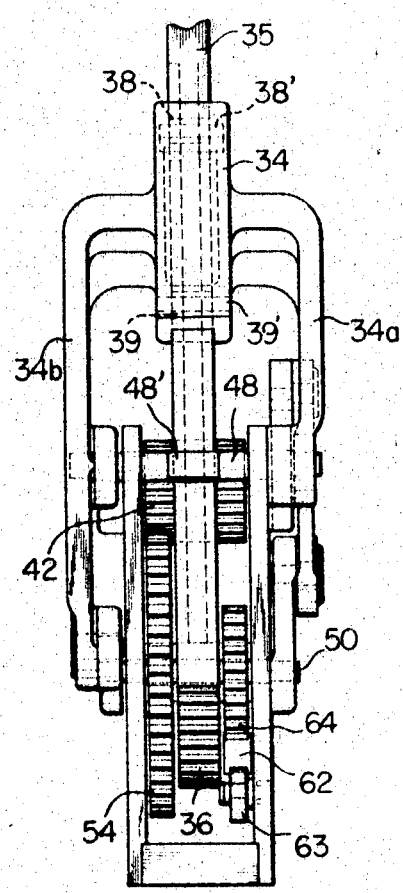
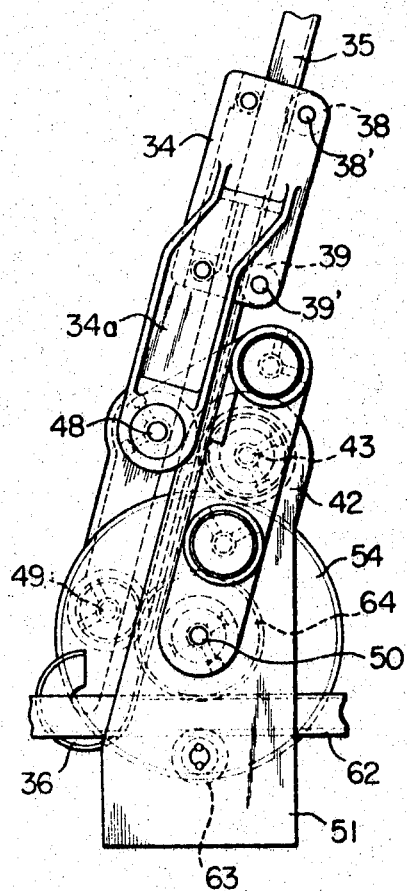

United States Patent Office 3,459,386
Patented Aug. 5, 1969

3,459,386
LAP FORMING AND DOFFING METHOD AND ITS APPARATUS
Iwao Ohsaki, Osaka-fu, Kazuyoshi Fukui, Ise-shi, and Shinzo Kitamura, Akashi-shi, Japan, assignors to Tokyo Boseki Kabushiki Kaisha and Kanpatsu Kogyo Kabushiki Kaisha, both of Osaka, Japan, and both companies of Japan
Filed Jan. 10, 1967, Ser. No. 608,343
Claims priority, application Japan, Jan. 14, 1966, 41/2,142; Mar. 18, 1966, 41/16,984; Apr. 22, 1966, 41/25,775
Int. Cl. B65h 75/02
U.S. Cl. 242—55.1         19 Claims

ABSTRACT OF THE DISCLOSURE

An improved automatic lap forming method and lap forming machine having a single lap roller and biasing means for maintaining constant lap forming pressure and an automatic doffing means for doffing full packaged laps and an automatic feeding means for feeding a bare mandrel to lap forming position on the signal lap roller.

---

The present invention relates to an automatic lap forming method and apparatus, and particularly relates to an improved automatic lap forming method and apparatus characterized by using a single lap roller which can be applied for forming a sliver lap, ribbon lap or picker lap in a yarn manufacturing process. The apparatus for making a sliver lap, ribbon lap or picker lap is hereinafter referred to as a lap forming apparatus applied for yarn manufacturing processes.

The so-called automatic lap forming method and apparatus have been developed in recent years and some apparatus has been used in mill operations. All of these apparatuses are provided with a pair of lap rollers on which a lap is formed by frictional contact with both lap rollers. To obtain uniform density of lap, an apparatus for controlling the contact pressure between the lap and lap rollers comprises a pair of support members for supporting both ends of the lap shaft and a pair of shifting mechanisms for shifting the supporting members as the diameter of forming lap increases, control means for controlling the contact pressure between forming lap and lap rollers by using friction force or peneumatic pressure or oil pressure. In the above-mentioned apparatus, the lap shaft is disposed between both lap rollers in such a way that the axis of the lap shaft is parallel with the respective axis of the lap rollers. In some cases, the lap rollers are disposed in such a way that a lap roller disposed at the feed side is positioned at a slightly higher position than the other lap roller, so as to afford easy doffing of full packaged laps. However, there is possibility of developing so-called crease while forming a lap by the abovementioned conventional method. Moreover, the doffing mechanism for doffing full packaged laps from the lap forming position on a pair of lap rollers, is rather complicated because the forming lap is always supported by the double lap rollers. Consequently, when it is required to doff a full packaged lap, the full packaged lap must be pushed out by some mechanical means; moreover, the starting of new lap forming is usually complicated because of complicated doffing mechanism.

The principal object of the present invention is to provide an improved lap forming method and automatic apparatus characterized by using a single lap roller which affords uniform lap forming and simple doffing operation of full packaged laps.

Another object of the present invention is to provide uniform full packaged laps without any creases.

A further object of the present invention is to provide full automatic lap forming apparatus for reducing the production cost of yarn.

A still further object of the present invention is to provide a fully automatic doffing method and apparatus of full packaged laps.

The invention will be better understood from the following description taken in connection with the accompanying drawings and its scope will be pointed out in the appended claims.

Figure 3:
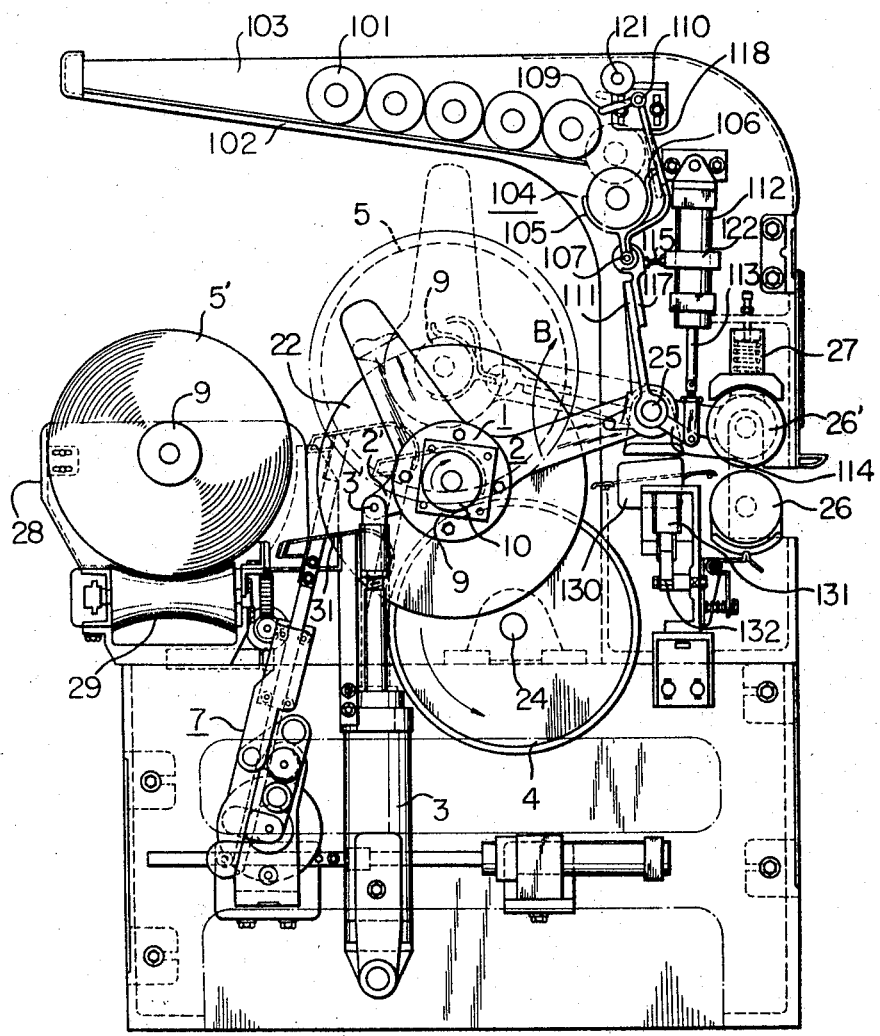
Figure 4:
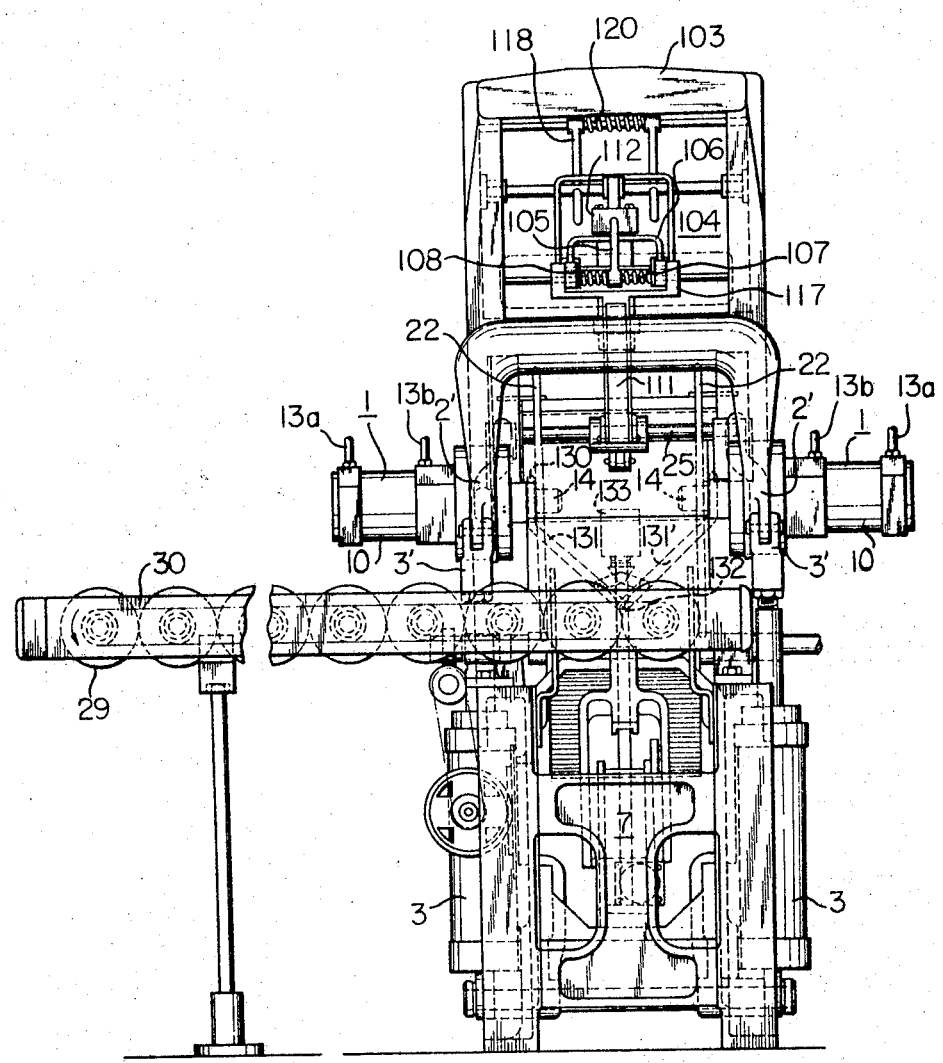
Figure 11A:
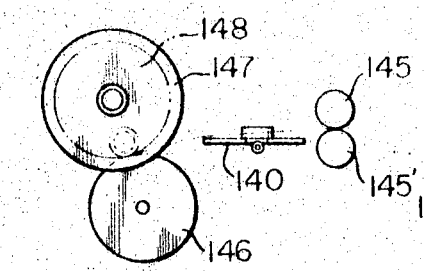
Figure 11B:
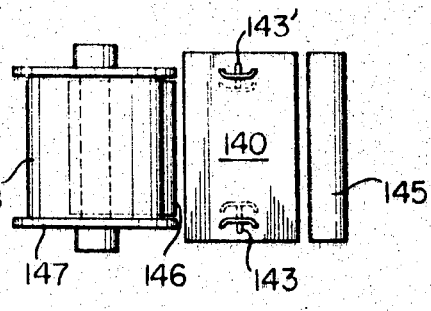
Figure 5:
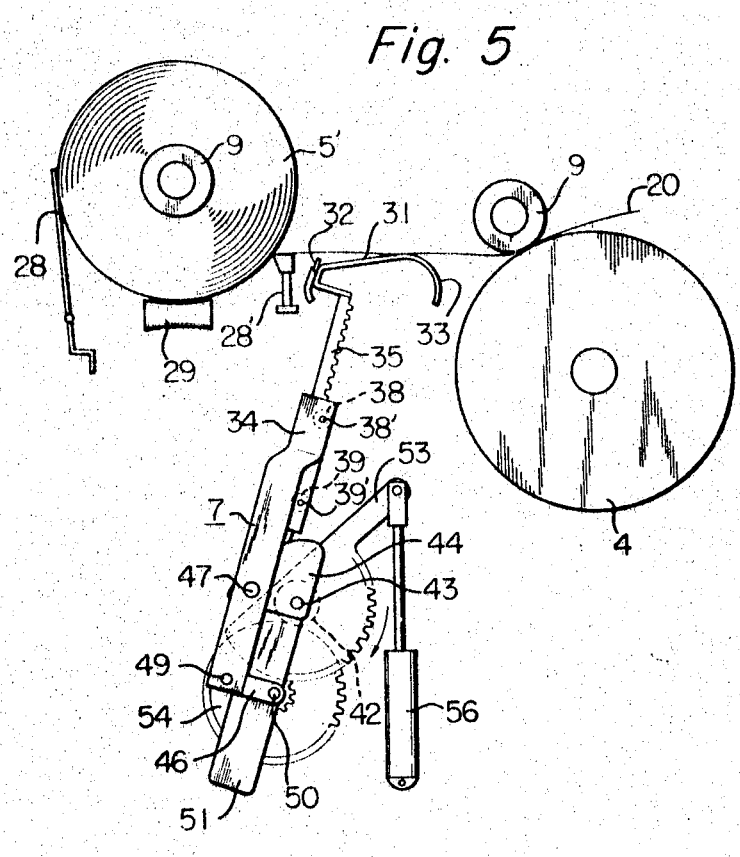
Figure 9:
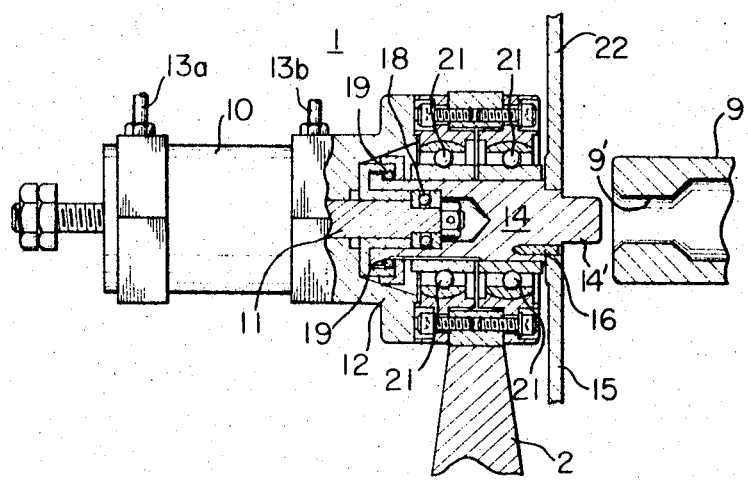
Figure 10:
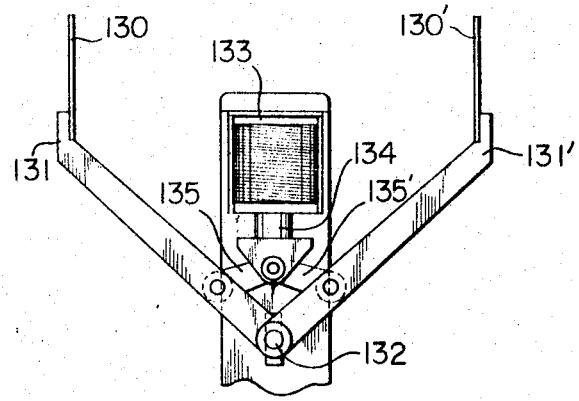
Figures 12, 13:
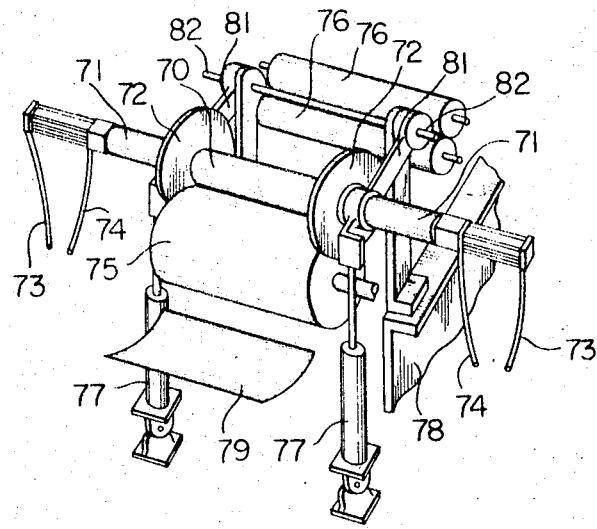
Figure 11C:
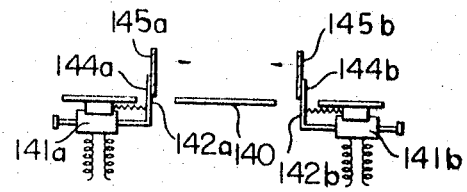

FIG. 3 is a side view with a side frame and covers removed for showing the principal mechanism of the lap forming machine of the invention, FIG. 4 is a front view with some minor elements omitted for showing the principal mechanism of the lap forming machine as shown in FIG. 3, FIG. 5 is a schematic drawing of mechanism for cutting the sheet of fibers after a full packaged lap is doffed according to the invention, FIGS. 6A, 6B are principal side and front views of actuating mechanism for cutting a sheet of fibers and carrying a starting end portion of said sheet of fibers after completion of cutting to a bare spool disposed upon the lap roller, FIGS. 7A, 7B, 7C, 7D and 7E are explanatory drawings for showing how to cut the sheet and carry the starting edge portion of the lap to a bare spool after doffing a full packaged lap, FIGS. 8A and 8B are detailed front and side views of the actuating mechanism for cutting a sheet of fibers and carrying a starting end portion of said sheet of fiber in accordance with the invention, particularly shown in FIGS. 3 and 4, FIG. 9 is an embodiment for supporting a spool and doffing a full packaged spool according to the invention, FIG. 10 is an embodiment for changing a guide plate disposed at the forward position of the lap forming machine according to the invention, FIGS. 11A, 11B and 11C are other embodiments for changing guide plates disposed at the forward position of the lap forming machine according to the invention, FIG. 12 is a perspective view of another embodiment of the lap forming machine of the invention, FIG. 13 is a side view, omitting some minor elements and partly in section, of the lap forming machine according to FIG. 12, FIGS. 14A, 14B, 14C, 14D and 14E are explanatory drawings for showing the cutting of sheet of fibers and carrying the starting end portion of said sheet, by using the lap forming machine shown in FIG. 12.

Principal mechanism of lap forming and doffing apparatus of the invention

Figure 1:
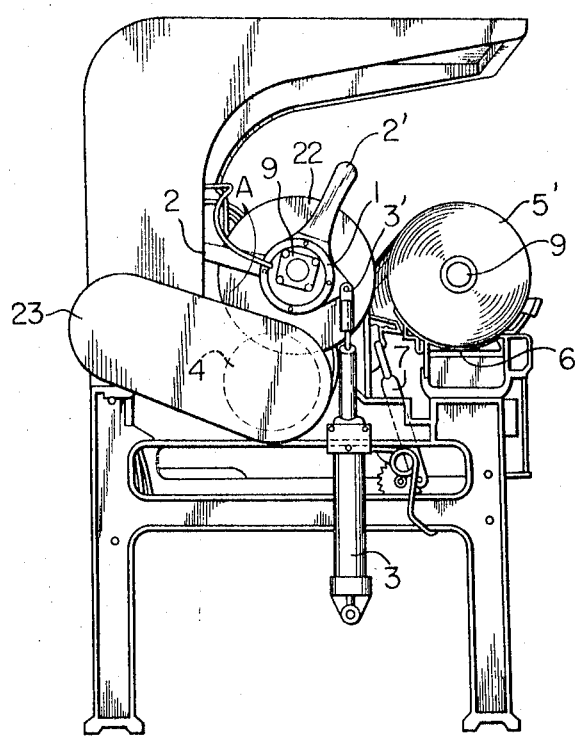
FIG. 1 is a side view of the lap forming machine of the invention.
Figure 2:
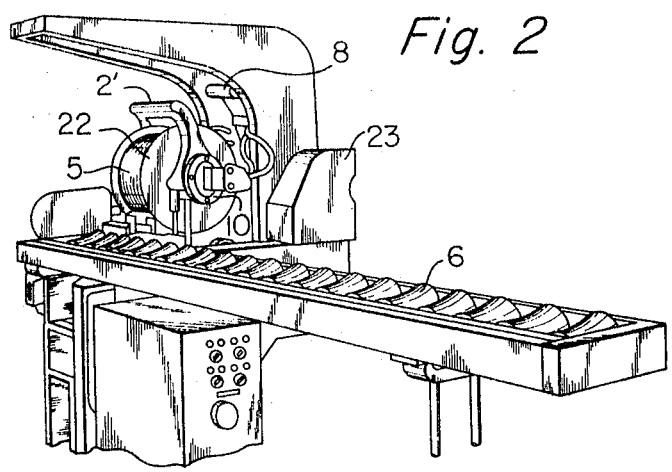
FIG. 2 is a perspective view of the lap forming machine of the invention.

Referring to FIGS. 1 and 2, the automatic lap forming and doffing apparatus of the invention comprises a lap forming means comprising a pair of supporting members 1 for supporting a mandrel or lap spool, a pair of swing arms 2 connected with the respective supporting members 1, a pair of loading mechanisms for maintaining contact pressure of forming lap with the lap roller 4 pivoted at their top ends 3' to the respective supporting members 1 in such a way that the swing arms 2 are turned in the counterclockwise direction as shown by arrow A as the diameter of forming lap increases, a single lap roller 4 for rotating the lap by frictional contact; a cutting means 7 for cutting the sheet of fibers disposed between the lap forming position of the lap roller 4 and a doffed full packaged lap 5' on a conveyor 6; and a lap mandrel or spool feeding means 8 for feeding an empty mandrel or spool 9 to the working position of the lap roller 4. The cutting means 7 is provided with a carrying means for carrying the front end portion of the cut sheet to the lap mandrel or spool 9 disposed at the working position of the lap roller 4 after completion of its cutting operation.

In the above-mentioned embodiment, the lap mandrel or spool 9 is supported by the supporting member 1 in such a way that the longitudinal axis of the shaft or spool 9 of a full packaged lap is positioned slightly forward of the longitudinal axis of the lap roller 4, consequently, when the supporting member 1 releases its support of the lap mandrel or spool 9, the full packaged lap rolls forward by its own weight. This is one of the advantages of the lap forming apparatus of the invention.

Lap forming mechanism and its operation

Referring to FIGS. 3, 4 and 9, a pair of support members 1 for supporting a lap mandrel or spool 9 comprises an air chamber 10 having an air piston 11 provided with a valve (not shown) inserted into an air cylinder support 12, a slide shaft 14 coaxially mounted on the air piston 11 so as to rotate around the air piston 11. A ball bearing 18 and plurality of balls 19 provide smooth rotation of the slide shaft 14 around the piston 11. An air inlet and outlet 13a and 13b are disposed at the respective end portions of the air chamber 10 as shown in FIG. 9.

The air cylinder 10 is supported by the respective swing arm 2. The swing arm 2 is provided with a plurality of thrust bearings 21 so as to permit axial thrust of the slide shaft 14 as shown in FIG. 9. A lap plate 22 is coaxially secured to the top end of the respective slide shaft 14 by a pin 16. When compressed air is supplied to the air chamber 10 through the air inlet 13a, the piston 11 is pushed outward (right hand direction in FIG. 9), consequently, the slide shaft 14, and therefore, the lap plate 22 is instantaneously shifted towards the lap mandrel or spool 9 supported at its operating position of the lap roller by a support member (not shown) of feeding means. The shape of the end portion 14' of the slide shaft 14 is formed so as to engage with the side aperture 9' of the mandrel or spool 9. Consequently, when the slide shaft 14 is shifted towards the lap mandrel or spool 9, the end portion 14' of the slide shaft 14 is inserted into the side aperture 9' of the mandrel or spool 9, thereby the mandrel or spool 9 is supported by the slide shaft 14. On the other hand, when the compressed air is supplied to the air chamber 10 through the inlet 13b, the piston 11 is receded toward the left in FIG. 9. Consequently, the slide shaft is withdrawn from its supporting position, and the engagement of the end portion 14' of the slide shaft 14 with the side aperture 9' of the mandrel or spool 9 is released and the mandrel or spool 9 becomes free. The mandrel or spool 9 supported by the slide shaft 14 can rotate around the axis of the shaft 14 while engaging the slide shaft 14 with the side aperture of the mandrel or spool. As the supporting member 1 is connected with the supporting arm 2, the air chamber 10 can be swung around its supporting shaft (not shown) as the diameter of forming lap 5 increases.

The lap mandrel or spool 9 supported by the slide shafts 14 is disposed on the lap roller 4 which is mounted on a shaft 24. Consequently, the lap mandrel 9 is driven counter-clockwise by the frictional contact with the lap roller 4 which is driven by driving mechanism enclosed in a gear box 23. The contact pressure between the lap roller 4 and the mandrel or spool 9, that is, between the lap roller 4 and the forming lap on the lap mandrel or spool 9, is provided by the loading mechanism 3 comprising an air chamber and piston rod which is always loaded by air pressure. The top end portion 3' of the loading mechanism 3 is pivoted to a branch arm of the respective swing arms 2, as shown in FIG. 3. The swing arms 2 is rotatably mounted on a swing arm shaft 25, consequently, the swing arms 2 are turned in a direction shown by arrow B, as the diameter of the forming lap 5 increases while the loading mechanism provides uniform contact pressure between the forming lap 5 and the lap roller 4. Consequently, a lap can be formed with uniform density. As the forming lap 5 is rotated by frictional contact with the single lap roller 4, the chance of developing a crease in the lap 5 is remarkably reduced. The diameter of forming lap 5 increases as the winding length of a sheet of fibers fed from a pair of calender rollers 26, 26' increases. The contact pressure between the calender rollers 26, 26' is provided by a loading spring 27. The circular lap plates 22 prevent the edge portion of the forming lap 5 from extending outward. When the slide shafts 14 are receded outward for releasing the engagement of shafts 14 with the aperture at both ends of the mandrel or spool, the full packaged lap 5' formed around the mandrel or spool rolls onto the conveyor 6, the movement at the forward end is being stopped by a stop plate 28 disposed at the take-off end of the conveyor 6 in such a way that the full packaged lap 5' is supported on parabola drums 29 of the conveyor 6. As the parabola drums 29 are driven by a driving chain 30 in a counter-clockwise direction in FIG. 4, the full packaged lap 5' is conveyed away from the machine.

Means for cutting sheet of fibers and its operation

Referring to FIGS. 3, 4, 5, 6A, 6B, 7A, 7B and 7C, means for cutting the sheet of fibers between a full packaged lap 5' and an empty lap mandrel or spool 9 on the lap roller 4 comprises an elastic curved plate 31 secured to the top end of rack 35 disposed at the lower portion of the lap forming machine as shown in FIGS. 3, 4 and 5. The curved plate 31 is provided with a curved end portion 33 having the same transversel width as that of the sheet of fibers 20 and the same curvature as that of the spool 9. The rack 35 slides along a guide groove 34 having two pairs of guide rollers 38, 39 respectively mounted on shafts 38' and 39' which are disposed in the guide groove 34. The rack 35 is provided with a circular formed portion 36 on which rack teeth are disposed along a circular dedendum circle as shown in FIG. 7D. The circular formed portion 36 is provided with a vertical groove 40 having a curved bottom surface 41. The teeth of rack 35 mesh with a pinion 42 mounted on a shaft 43 disposed on a pair of connecting arms 44 and 45 and a supporting plate 51. An upper pivot shaft 48 having a cut portion 48' is supported by a pair of forked portions 34a and 34b branching from the guide groove 34. A pinion 42 is also secured to the shaft 43 and meshes with the teeth of the rack 35. The upper pivot shaft 48 is secured to the pair of forked portions 34a and 34b in such a way that, when the rack 35 is lifted upward and the circular formed portion 36 becomes engaged with the pinion 42, the cut portion 48' of the upper pivot shaft 48 enters the vertical groove 40 of the circular formed portion 36. The fan-shaped wheel 52 is provided with an actuating rod 53 connected at its top end with the top end of a piston rod 57 of a piston mechanism 56 by a connecting pin 58. The piston mechanism 56 is mounted on the machine frame by a pin shaft 59 in such a way that the piston mechanism 56 can swing around the shaft 59. Consequently, the fan-shaped wheel 52 is rotated by the traverse motion of the piston rod 57 of the piston mechanism 56. The fan-shaped wheel 52 meshes with a pinion 55 secured to the shaft 50 which is rotatably mounted on the connecting arms 46 and 47 and the supporting plate 51. A wheel 54 is secured to the shaft 50 and meshes with the pinion 42 mounted on the shaft 43. An articulated pin shaft 49 is mounted on the forked arms 34a and 34b. Consequently the forked arms 34a and 34b, parts of arms 44 and 45, 46 and 47 and the supporting plate 51 can form an articulated link motion.

When a forming lap 5 becomes full package, the slide shafts 14 of the supporting members 1 are pulled in the outward direction by the action of pistons 11 of the respective air chambers 10 by the action of the actuating means (not shown), the spool 9 of the full packaged lap 5 is released from by the slide shafts 14, consequently the full packaged lap 5 rolls forward and rests on parabola rolls 29 of the conveyer 6 as described already. Then the piston mechanism 56 is actuated by the action of another actuating means (not shown) so as to push the piston rod 57 downward, the fan-shaped wheel 52 rotates clockwise by the downward motion of the piston rod 57, the pinion 42 is rotated clockwise by power transmitted of through the pinion 53 and wheel 54. The curved plate 31 is provided with a comb 32 at its portion on the delivery side in such a way that the comb 32 is extended for the full transversel width of the curved plate 31 as shown in FIG. 5. Consequently, when the rack 35 meshes with the pinion 42 and is lifted upwards, the curved plate 31 and the comb 32 contact with the under side of the sheet of fibers 20 as shown in FIG. 7A. When the rack 35 is further lifted upwards by the rotation of the pinion 42, the comb 32 is inserted into the sheet of fibers 20 so that the sheet of fibers 20 is cut by the upward pushing action of the comb 32 and the curved plate 31, and the front end of the cut sheet of fibers 20 is supported by the comb 32 of the curved plate 31. After the rack 35 is lifted to the position where the cut portion 48' of the upper pivot shaft 48 enters the groove 40 of the circular formed portion 36, the motion of the rack 35 is restricted by the control mechanism shown in FIGS. 6A, 6B. The detailed controlled motion is clearly shown in FIG. 7D. After the pivot shaft 48 enters the groove 40 of the circular formed end portion 36 of the rack 35, the circular formed end portion 36 meshes with the pinion 42 and moves around the pinion 42 as designated by an arrow A from position designated by arrows C to D in a meshing condition, and during this movement, the relative engaging condition of the cut portion 48' of the shaft with the groove 40 is changed as shown in the drawing of FIG. 7D. Consequently, the circular end portion 36 of the rack 35 is moved around the pinion 42. As a result of the circular movement of the circular end portion 36 of the rack 35, and the link motion around the upper pivot shafts 44 and 45, 46 and 47, the top end portion of the rack 35, that is, the curved plate 31, moves in the sequence shown in FIGS. 7B and 7C. By the upward and rearward movement of the curved plate 31, the front end portion of sheet of fibers 61 is taken from the comb 32 and wound around the spool 9 as shown in FIG. 7B. As the curved plate 31 further moves rearwardly the curved end portion 33 presses the wound end of sheet 61 onto the spool 9. Consequently, the end 61 of cut sheet 20 is wound around the spool 9 in a stable and uniform manner. After the above-mentioned motion, the curved plate 31, that is, the rack 35 is receded from its working position to the original position by the upward lifting return motion of the piston rod 57. The above-mentioned actuating motion is provided with automatic control means or semi-automatic control means (not shown), or a push button system operated manually. So-called programming control system for actuating supporting members 1 and the piston mechanism can be applied to provide fully automatic lap forming and doffing motion.

Referring to FIGS. 8A and 8B, a modified embodiment for providing the rack 35 with upward and rearward motion is shown. In this embodiment, a rack 62 is used in place of the fan-shaped wheel 52. The rack 62 is connected to a piston member (not shown) which works in the same manner as the piston mechanism 56. A pinion 64 meshes with the rack 62 which is guided by a guide roller 63 which is disposed on supporting plates 51. The pinion 64 is secured to the shaft 50 which is disposed on the plates 51. The other eleemnts have the same functions and work in similar manners as the elements designated by the same numerals in the first embodiment illustrated in FIGS. 6A and 6B. In FIGS. 12, 13, 14A, 14B, 14C, 14D and 14E, another embodiment of means for cutting sheet of fibers and its operation are shown.

A mandrel or spool 70 is supported on a single lap roller 75 by a pair of supporting members 71 comprising air chambers connected with a pair of air conduits 73 and 74 respectively, and circular lap plates 72 which defines the shape of both side portions of the lap. A sheet of fibers is fed to the mandrel or spool 70 from a pair of calender rollers. These calender rollers are hereinafter referred to as a feed device. And when the full packaged lap is doffed by releasing the supporting members 71 from its supporting mandrel 70, the doffed full packaged lap is fed to a conveyer 86 by stopping the full packaged lap on the conveyer 86.

The supporting member 71 is supported by the respective swing arms 81 turnably mounted on a horizontal shaft 82 which is disposed on the machine frame 78. Two loading members 77 are connected at their top end portions with the respective extending end portions of the swing arms 81 as shown in FIG. 12. The lap forming operation of the above-mentioned apparatus shown in FIG. 12 is performed in the same manner as that of the apparatus shown in FIGS. 3 and 4.

Referring to FIGS. 13, 14A, 14B, 14C, 14D and 14E, when the supporting members 71 release their supporting engagement of the mandrel of the full packaged lap 83, the full packaged lap 83 rolls forward and its forward rolling is stopped by a stop plate 84 disposed at the take-off end of the conveyer 86. Consequently, the full packaged lap 83 is positioned on the conveyer 86 in such a way that the full packaged lap 83 is supported by the stop plate 84, small vertical plate 85 and the conveyer 86. The cutting device of the embodiment shown in FIG. 13, comprises a comb supporting member 87 transversely extending for the full width of the sheet of fibers 88, a comb 89 disposed on the comb support member 87, a piston mechanism 90 supported by a bobbin holder 91, a connecting rod connecting the piston of the piston mechanism 90 with a link motion mechanism 92 which provides the cutting motion of the comb 89 and another piston mechanism 98 provided with an insert plate 99 extending transversely.

The stop plate 84 is turnably mounted on a supporting shaft 94 disposed to the machine frame 78. A piston mechanism 93 is connected its piston with the branch lever 95 of the stop plate 84 which is loaded by a dead weight 96 suspended at the end portion of the branch lever 95.

Figure 14A:
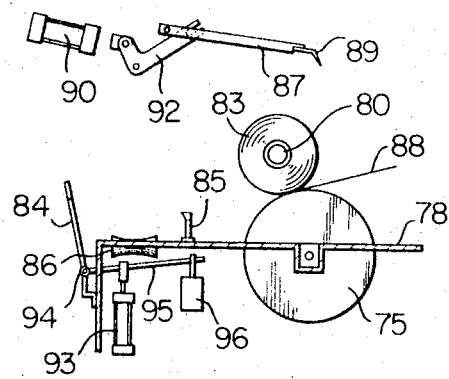
Figure 14B:
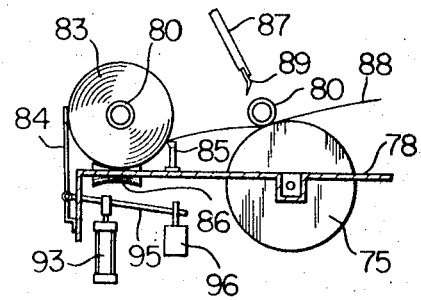
Figure 14C:
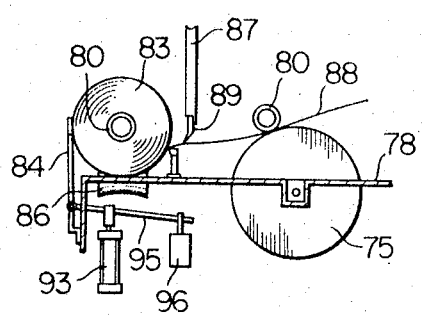
Figure 14D:
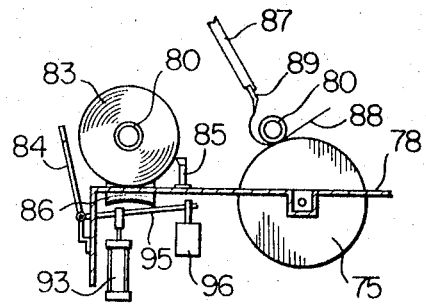
Figure 14E:
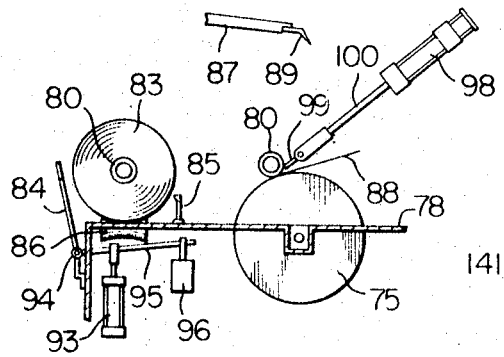

Referring to FIGS. 14A, 14B, 14C, 14D and 14E, the comb 89 is always supported at the upper position of the lap forming mechanism while forming a lap. And the stop plate 84 is also always positioned in a forward position during the lap forming operation. When the package of lap 83 becomes full size, the supporting members 71 release its supporting engagement with the mandrel 80 and the full packaged lap 83 rolls forward and its forward movement is stopped by the stop plate 84 which is already positioned at its vertical position as shown in FIG. 14B. The full package lap 83 is stably supported on the conveyor 86 by the stop plate 84 and small plate 85, while the comb 89 is shifted downward by the downward movement of the comb support member 87 which is provided by the motion of the mechanism of link motion 92 which is actuated by the piston mechanism 90. When the comb 89 is shifted to its lowest position, the comb 89 goes into and then cuts the sheet of fibers 88 at its position between the full packaged lap 83 and the mandrel 80 disposed on the lap roller 75. Then, the comb supporting member 87 swings counterclockwise (in FIG. 14D) while the comb 89 carries the front end portion of the sheet of fibers 88 in such a way that the points of the comb 89 are shifted over the mandrel 80. Consequently, the front end portion of the sheet of fibers 88 is carried to the feed side of the mandrel 80, as shown in FIG. 14D, while on the other hand, the stop plate 84 is turned outward by the pushing up motion of the piston of the piston mechanism 93 so as to release the supporting of the lap by the stop plate 84 and the small plate 85.

After the above-mentioned carrying motion by the comb 89, the comb 89 and the comb supporting member 87 are turned to the uppermost position, while the insert plate 99 pushes the front end portion of the sheet of fibers into the intervened position between the mandrel 80 and the sheet of fibers on the lap roller 75, consequently, the delivery of sheet of fibers is started to wind it uniformly around the mandrel 80. Then the insert plate 99 is receded from the mandrel 80 to the original resting position by the working operation of the piston mechanism 98.

Means for feeding empty lap mandrel or spool and its operation

Referring to FIGS. 3 and 4, means for feeding bare lap mandrel or spool to the working position of the lap roller 1 comprises a reserve plate 102 for supporting a plurality of bare lap mandrels or spools 101 disposed on the upper, forward, elongated arm 103; a spool-receiving member 104 comprising a curved supporting arm 105 turnably mounted on a shaft 107, another curved supporting arm 106 secured to the shaft 107, a pair of helical springs 108 mounted on the shaft 107 in such a way that the ends of the springs 108 press the arm 105 in the clockwise direction; an arm 111 provided with a bracket 117 at its upper end portion and rotatably mounted at its bottom end on the swing arm shaft 25, and provided with a branch arm 114 which is connected to a piston rod 113 of a piston mechanism 112; a stopper arm 109 turnably mounted on a shaft 110 disposed on the upper forward elongated arm 102; and a branch arm 118 of the stopper arm 109 extending downward.

When a control means (not shown) is actuated to feed a bare spool to the working position of the lap roller 4, the piston mechanism is actuated to pull the piston rod 113 upward, consequently, the arm 111 is turned counterclockwise so as to carry a bare spool 101 supported by the spool receiving member 104 and after carrying the bare spool 101 to the working position of the lap roller 4, the slide shaft 14 of the supporting members 1 are pushed inward and support the bare spool stably, while the stopper 109 turns clockwise by the force of a spring 120 which is mounted on the shaft 110 so as to permit the feeding of a bare spool 101 to the position shown by the dotted line 119, which position is positively defined by a stopper 121 disposed on the arm 102. After the supporting members 1 supports a bare spool, the piston mechanism 112 is actuated to push the piston rod 113 downward and the arm 111 is turned clockwise. While clockwise turning motion of the arm 111 is taking place, the curved support arm 105 is positively turned counterclockwise around the shaft 107, consequently, the spool 101 which is being supported is removed by force from the spool receiving member 104. When the spool receiving member 104 returns to the uppermost position by the clockwise turning of the arm 111, a projection 115 projecting from the support arm 105 contacts with the stopper 122 so as to sufficiently open the intervening space between the support arms 105 and 106 for receiving a new bare spool 101, while the top end of the support arm 106 presses the branch arm 118 so as to turn the stopper arm 109 counterclockwise around the shaft 110 for stopping further supply of new bare spools 101 to the spool receiving member 104. And, while the counterclockwise turning of the arm 111 is taking place, the curved support 105 is pressed clockwise by the spring 108, consequently, the bare spool 101 is firmly supported by the spool receiving member 104. As mentioned above, the supply motion of bare spools 101 is repeated automatically.

In FIG. 13, another embodiment of mean for feeding an empty spool to the working position of the lap roller 75 is shown. The means for feeding a bare spool comprises a piston mechanism 125, piston rod 126 and a spool receiver 127 connected to the end portion of the piston rod 126 and a stopper 128 disposed on the spool holder 91. The operation of the above-mentioned spool feeding mechanism is performed in almost the same manner as that of the first embodiment shown in FIGS. 3 and 4.

Means for reducing the intervening distance between guide plates for feeding sheet of fibers and its operation Referring to FIGS. 3, 4 and 10, a pair of guide plates 130, 130' are vertically secured to the top portion of a pair of supporting arms 131, 131' which are turnably mounted on a shaft 132. A solenoid 133 is disposed on the machine frame in the relative position shown in FIG. 10. A plunger 134 is connected by a pair of connecting rods 135, 135' by pins 136, 137, 137' in such a way that the connecting rods 135 and 135', supporting arms 131 and 131' form a link motion mechanism. Just before the forming lap on the lap roller 4 becomes a predetermined size, the solenoid 133 is excited by control means (not shown) so as to pull the plunger 134 upward, consequently, the intervened space between the guide plates 130 and 130' becomes narrow by the link motion of the connecting rods 135 and 135' and the supporting arms 131 and 131' by the upward motion of the plunger 134. And, while the cutting motion by the curved plate 31 is taking place, the intervened space between the guide plate 130, 130' is maintained in a narrow condition, and before winding sheet of fibers around a new bare spool is started, the solenoid is de-energized, consequently, the guide plates 130, 130' are shifted to the normal position for feeding sheet of fibers having normal width.

In FIGS. 11A, 11B and 11C, another embodiment of means for reducing the intervening distance between the guide plates for feeding a sheet of fiber is shown. A pair of transversely elongated apertures 143 and 143' are provided in a guide plate 140 which is disposed between a pair of calender rollers 145 and a lap roller 146. Electric magnets 141a, 141b are disposed under the apertures 143, 143' respectively. A pair of movable cores 142a, 142b are inserted transversely into the respective electric magnets 141a and 141b respectively as shown in FIG. 11C. The cores 142a, 142b are provided with upward extending portions 144a, 144b so as to pass through the respective apertures 143, 143'. A pair of vertical guide plates 145a and 145b are secured to the respective upward extending portions 144a, 144b.

Consequently, the intervening distance between the vertical guide plates 145a and 145b can be changed by exciting the electric magnets when it is necessary to change the distance before cutting the sheet of fibers as described in the explanation on the first embodiment.

What is claimed is:

1. In a method for forming a lap by lap forming apparatus, the improvement comprising: rotating a mandrel at a winding position by a single lap roller, feeding a sheet of fibers around said mandrel at said winding position to form a lap, displacing said lap from its winding position to a delivery position in front of said lap forming apparatus when the size of the lap reaches a predetermined full package size, supplying a bare mandrel to said winding position upon said single lap roller, next pushing a lap cutting member to said sheet of fibers at a position between said delivery position and said bare mandrel supplied to said winding position, cutting said sheet of fibers by further pushing motion of said lap cutting member in a direction approximately perpendicular to the path of said sheet of fibers, carrying a cut end portion of said sheet of fibers to said bare mandrel by movement of said lap cutting member, wrapping said end portion of said sheet of fibers around said mandrel, and pressing said mandrel to said lap roller uniformly during said winding operations.

2. An improved lap forming method according to claim 1, wherein said lap cutting member is pushed to said sheet of fibers from the under side of said sheet of fibers.

3. An improved lap forming method according to claim 1, wherein said lap cutting member is pushed to said sheet of fibers from the upper side of said sheet of fibers.

4. An improved lap forming method according to claim 1, further including making the feeding width of said sheet of fibers narrower just before the size of said lap becomes the predetermined full package size.

5. An improved lap forming method according to claim 1, wherein said displacing of the full packaged lap to delivery position is performed by releasing the grip of support means of said mandrel, whereupon said full packaged lap rolls to said delivery position by its own weight.

6. An improved lap forming method according to claim 1, wherein said carrying a cut end portion of said sheet of fibers to said bare mandrel is positively performed by inserting said cut end portion of said sheet of fiber into a narrow space between said bare mandrel and said lap roller.

7. In an automatic lap forming apparatus, the improvement comprising means for releasably and rotatably supporting a mandrel supplied to said apparatus, winding mechanism for rotating said mandrel to wind a sheet of fibers around said mandrel, feeding device for feeding a sheet of fibers to said winding mechanism to form a lap, lap delivery means disposed at a position in front of said winding mechanism, means for cutting said sheet of fibers disposed at a position between said winding means and said delivery device but positioned out of the path of said sheet of fibers except for a period of cutting operation, means for supplying a bare mandrel to a winding position of said winding mechanism, said cutting means carrying a cut end portion of said sheet of fibers fed from said cut end portion of said sheet of fibers fed from said feeding device to a bare mandrel supported by said supporting means, said winding mechanism having a single lap roller.

8. An improved lap forming apparatus according to claim 7, further including means for biasing said mandrel toward said single lap roller to maintain constant lap forming pressure.

9. An improved lap forming apparatus according to claim 7, wherein said winding mechanism comprises said single lap roller, driving mechanism for driving said lap roller, and loading means for biasing said supporting means toward said lap roller, said loading means comprising a pair of loading cylinders and a fluid pressure control system, whereby said mandrel is always biased toward said rotating lap roller together with wound sheet of fibers around said mandrel during the winding operation.

10. An improved lap forming apparatus according to claim 7, wherein said cutting means is disposed under the path of said sheet of fiber.

11. An improved lap forming apparatus according to claim 7, wherein said cutting means is disposed over the path of said sheet fibers.

12. An improved lap forming apparatus according to claim 7, wherein said cutting means comprises a comb disposed under the path of said sheet of fibers, said comb having the same transverse width as that of said sheet of fibers, a curved plate supporting said comb and curved towards said winding mechanism, said curved plate having the same transverse width as that of said comb, and reciprocating mechanism for shifting said curved plate to a position beyond the path of said sheet of fibers and then carrying said curved plate along the upper surface of said mandrel supported by said supporting means.

13. An improved lap forming apparatus according to claim 12, wherein said reciprocating mechanism for said curved plate comprises a rack connected to the bottom end of said curved plate, said rack provided with a circular formed portion at its bottom end portion on which rack teeth are disposed along a dedendum circle, said rack being guided by a guide groove having a pair of forked portions branching from said guide groove, said circular formed portion of said rack being provided with a vertical groove and a circular bottom aperture connected with said vertical groove; an upper shaft disposed on a supporting plate of said reciprocating mechanism, a pinion meshed with teeth of said rack and mounted on said upper shaft, an intermediate wheel secured to said upper shaft, a lower shaft disposed on said supporting plate, an upper pivot shaft having a partly cut-away portion and disposed on said forked portion of guide groove in such a way that said cut-away portion of said upper pivot shaft enters into said vertical groove of said circular formed portion of said rack when said rack is shifted upward and meets with said upper pivot shaft, said upper pivot shaft having the same thickness as that of bottom aperture of said circular formed portion of rack which is larger than the intervening space of said vertical groove, a lower pivot shaft disposed on said supporting plate, a pair of arms turnably mounted on said upper pivot shaft and upper shaft, a pair of arms turnably mounted on said lower shaft and lower pivot shaft, said pair of arms, said forked portions of said guide groove, said supporting plate, said upper and lower pivot shaft, and said upper and lower shafts forming a link motion mechanism which provides the reciprocal circular motion of said upper pivot shaft around said upper shaft; and actuating means to rotate said intermediate wheel secured to said upper shaft.

14. An improved lap forming apparatus according to claim 7, wherein said supporting means comprises a pair of swing arms disposed at a symmetrical transverse position in said apparatus, each swing arm supporting a horizontal supporting member provided with air chamber, a circular lap plate disposed at an inside end portion of said supporting member, said air chambers of said swing arms being connected to an air source for said apparatus.

15. An improved lap forming apparatus according to claim 7, wherein said cutting means is disposed at a position between said winding mechanism and delivery device, said cutting means comprising a link motion mechanism supported by said apparatus, a piston mechanism connected to said link motion mechanism, a reserve plate for holding a plurality of bare mandrels, said reserve plate being connected to said link motion mechanism, a comb support member mounted on said link motion mechanism, said link motion mechanism extending downwards, a comb secured to the bottom end of said comb support member, said comb having the same transverse width as that of said sheet of fibers; said carrying means for carrying bare mandrels being provided with a mandrel receiver at a position adjacent to the outlet of said reserve plate, said piston mechanism effecting an upward and rearward motion of said comb support member by moving said link mechanism.

16. An improved lap forming apparatus according to claim 15, wherein said cutting means further including a lap insert plate disposed under said reserve plate, an operating piston mechanism connected to said lap insert plate, whereby said lap insert plate works to aid the wrapping of the starting end of said sheet of fibers around a bare mandrel supplied to said winding mechanism by said mandrel receiver.

17. An improved lap forming apparatus according to claim 7, wherein said lap delivery device is provided with means for positively supporting a full packaged lap comprising a small plate rigidly disposed on the machine frame in such a way that said small plate is parallel to a revolving shaft of said lap roller, a stop plate turnably mounted outside of said small plate in a parallel condition with said small plate, an operating piston mechanism for actuating turning motion of said stop plate, whereby, when a full packaged lap is carried to said delivery device, said operating piston mechanism actuates to turn said stop plate, the full packaged lap is positively supported by said small plate and said stop plate.

18. An improved lap forming apparatus according to claim 7, further including means for reducing the transverse width of the sheet of fibers fed to a mandrel, said reducing means being disposed at a position before feeding said sheet of fibers to said winding mechanism.

19. An improved lap forming apparatus according to claim 18, wherein said means for reducing the transverse width of sheet of fibers comprises a pair of guide plates for guiding a sheet of fibers while feeding said sheet of fibers to said winding mechanism, a pair of curved cores for supporting said guide plates disposed on the machine frame at the feed side of said winding mechanism, electric magnets for transversely shifting said curved cores, thereby when the size of lap winding around said mandrel approaches full size, said electric magnets are energized and said curved cores are shifted in an inward direction before the doffing of said full packaged lap, whereby the width of the end portion of full packaged lap is reduced.

References Cited

UNITED STATES PATENTS

| 2,498,224 | 2/1950 | Stone | 242—65 |
| 2,520,826 | 8/1950 | Beck | 242—65 |

FOREIGN PATENTS

| 703,591 | 2/1954 | Great Britain. |
| 823,711 | 11/1959 | Great Britain. |

WILLIAM S. BURDEN, Primary Examiner